(12) United States Patent
Kruck

(10) Patent No.: US 11,890,917 B2
(45) Date of Patent: Feb. 6, 2024

(54) ADJUSTABLE WINDOW SHADE AND METHODS OF USING SAME

(71) Applicant: Glendon Marvin Charles Kruck, Brandon (CA)

(72) Inventor: Glendon Marvin Charles Kruck, Brandon (CA)

(*) Notice: Subject to any disclaimer, the term of this patent is extended or adjusted under 35 U.S.C. 154(b) by 867 days.

(21) Appl. No.: 16/937,144

(22) Filed: Jul. 23, 2020

(65) Prior Publication Data

US 2021/0070151 A1 Mar. 11, 2021

Related U.S. Application Data

(60) Provisional application No. 62/898,234, filed on Sep. 10, 2019.

(51) Int. Cl.
*B60J 1/20* (2006.01)
*B60R 11/00* (2006.01)

(52) U.S. Cl.
CPC ..... *B60J 1/2011* (2013.01); *B60R 2011/0026* (2013.01); *B60R 2011/0057* (2013.01); *B60R 2011/0084* (2013.01)

(58) Field of Classification Search
CPC ... B60J 1/2011; B60J 3/02; B60R 2011/0026; B60R 2011/0057; B60R 2011/0084; E06B 3/32
See application file for complete search history.

(56) References Cited

U.S. PATENT DOCUMENTS

| | | | | |
|---|---|---|---|---|
| 3,046,048 A * | 7/1962 | Cheney | ................... | B60J 11/08 160/370.21 |
| 4,387,541 A * | 6/1983 | Boomershine | ............ | E06B 3/28 52/202 |
| 4,409,758 A * | 10/1983 | Dickerson | ................. | E06B 3/28 160/369 |
| 5,040,841 A | 8/1991 | Yang | | |
| 5,806,256 A * | 9/1998 | Byrne | ....................... | E06B 3/28 52/656.1 |
| 9,150,088 B2 * | 10/2015 | Yang | ........................ | B60J 11/08 |
| 9,499,030 B1 * | 11/2016 | Gong | ..................... | B60J 1/2011 |
| 2004/0130178 A1 * | 7/2004 | Conforti | .................. | B60J 11/08 296/97.9 |
| 2008/0191509 A1 * | 8/2008 | Monahan | ............... | B60J 1/2091 296/97.5 |
| 2009/0183844 A1 * | 7/2009 | Alkhoury | .................. | E06B 9/52 160/369 |
| 2013/0112355 A1 * | 5/2013 | Roth | ...................... | A47H 23/00 160/127 |
| 2019/0337372 A1 * | 11/2019 | Lee | .......................... | B60J 3/007 |
| 2021/0070151 A1 * | 3/2021 | Kruck | .................... | B60J 1/2011 |
| 2021/0402855 A1 * | 12/2021 | Williams | ............... | B60Q 1/302 |

OTHER PUBLICATIONS

Haute-Decor, Attract Magnetic Wreath Hanger, https://www.amazon.ca/Haute-D%C3%A9cor-Attract-Magnetic-Wreath-Hanger/dp/B008G40WOQ/ref=asc_df_B008G40WOQ/?tag=googleshopc0c-20&linkCode=df0&hvadid=294880809051&hvpos=103&hvnetw=g&hvrand=13166787484333032046&hvpone=&hvptwo=&hvqmt=&hvdev=c&hvdvcmdl=&hvlocint=&hvlocphy=9001548&hvtargid=pla-304630694348&psc=1 (Last accessed Oct. 20, 2020).

* cited by examiner

*Primary Examiner* — Beth A Stephan
(74) *Attorney, Agent, or Firm* — Oyen Wiggs Green & Mutala LLP

(57) ABSTRACT

An adjustable window shade having a magnetic attachment point for mounting on a window and a shade portion with a magnet, the shade portion being detachably engageable with the magnetic attachment point via the magnet. Methods of installing and using the window shade are disclosed.

17 Claims, 8 Drawing Sheets

ADJUSTABLE WINDOW SHADE AND METHODS OF USING SAME

REFERENCE TO RELATED APPLICATIONS

This application claims priority to, and the benefit of, U.S. provisional patent application No. 62/898,234 filed 10 Sep. 2019, which is hereby incorporated herein by reference for all purposes.

TECHNICAL FIELD

Some embodiments of the present invention relate to a window shade for blocking sunlight or another undesirable source of bright light from the direct field of view of a driver or passenger in a vehicle. Some embodiments of the present invention relate to an adjustable window shade for vehicles. Some embodiments of the present invention relate to methods of deploying and/or adjusting the position of a window shade on a vehicle.

BACKGROUND

To block blinding sun or other undesirable light sources from impeding their vision, drivers or passengers in vehicles often use sun visors, a built-in component located in a vehicle's interior and above the windshield. Sun visors are typically pivotable about a hinged connection so that they can be lowered in front of the driver or passenger, or be turned towards a side window. However, their movement is limited and may not be effective at blocking sunlight or other direct sources of light shining through the windshield or the side window at a low angle into the driver's or passenger's eyes. Typically, the sun visor is coupled to the roof of the vehicle and therefore can only be used to block sun or other undesirable light sources that are emitting light from a relatively high position relative to the horizon.

Other structural features used to block blinding sun or other undesirable light sources in vehicles include the provision of shading or tinting on all or a portion of a window. Again, the position of the shading or tinting cannot be adjusted by a driver, and often the shading or tinting is provided only along an upper portion of the window.

The limitations of existing structures used to block blinding sun or other undesirable light sources mean that sometimes the sun or undesired light may reach the driver's or passenger's eyes, particularly if the light source is emitting light from a relatively low position relative to the horizon, e.g. as frequently occurs when driving a vehicle towards a sunrise or sunset event. This can result in the driver's vision being impaired, thereby increasing the risk of an accident, and/or can result in irritation of the driver or passengers of a vehicle.

There is a general desire for an adjustable window shade for vehicles that avoids at least some of the foregoing limitations. The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides an adjustable window shade for vehicles. The window shade has an attachment mechanism with magnetic elements for easy deployment and for adjustment.

One aspect of the invention provides a window shade having a magnetic attachment point adapted to be mounted on or affixed to a window; and a shade portion having a magnetic element for engaging the magnetic attachment point.

In some embodiments, the magnetic attachment point has first and second magnets adapted to be secured in position on the window by the relative attractive magnetic forces between the first and second magnets when the first and second magnets are collocated on opposite sides of the window.

In some embodiments, the window shade further comprises a boundary element on a windshield surface of a shade body of the shade portion. The boundary element is to provide a standoff distance between the windshield and the shade body when the window shade is in a deployed configuration.

In some embodiments, the window shade further comprises a handle on an interior side of the shade body.

Another aspect of the invention provides a method of deploying a window shade on a window of a vehicle. The method includes the steps of mounting a magnetic attachment point on the window; and securing a shade portion to the magnetic attachment point via a magnetic element provided on the shade portion.

In some embodiments, the step of mounting a magnetic attachment point on the window includes securing first and second magnets together on opposed sides of the window via the relative attractive magnetic forces between the first and second magnets, the first magnet being positioned on an interior side of the window and the second magnet being positioned on an exterior side of the window.

In some embodiments, the step of securing the shade portion to the magnetic attachment point includes surrounding the first magnet with a boundary element projecting from a windshield surface of the shade portion.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Figure 1:
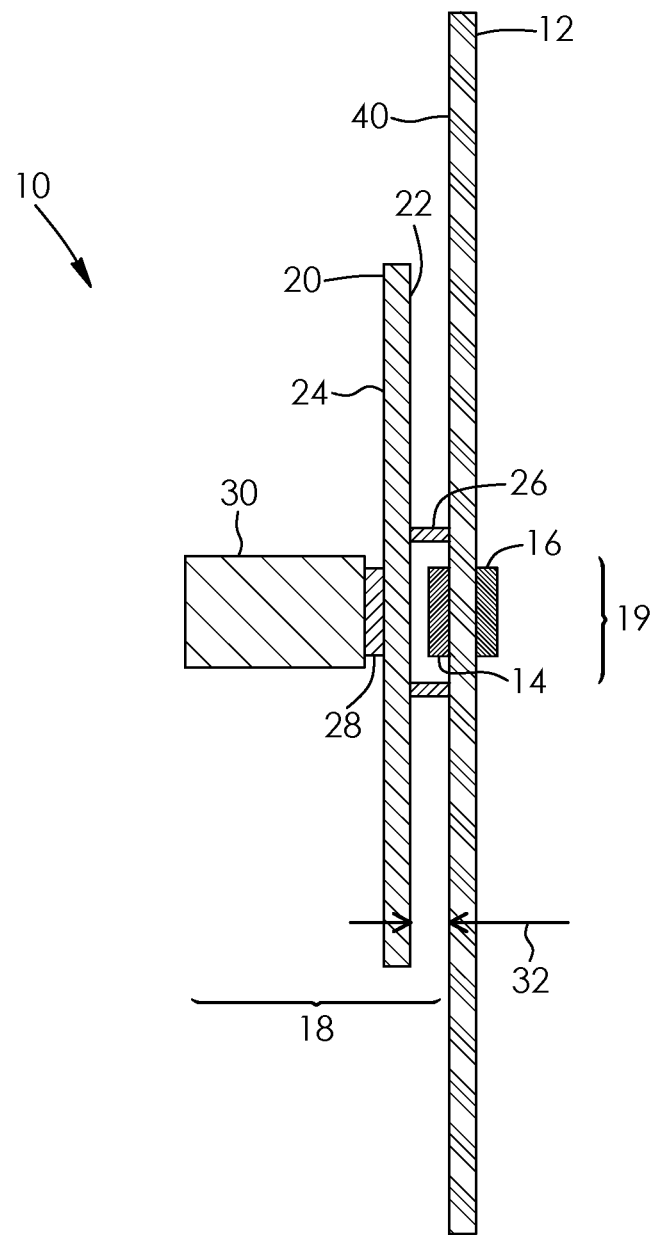
FIG. 1 shows a cross-sectional view of an embodiment according to the invention, wherein the embodiment is secured to a windshield in an installed configuration.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

As used in this specification, the term "vehicle" includes any type of movable apparatus having a windshield or window, including cars, motorcycles, trucks, vans, sport utility vehicles (SUVs), recreational vehicles (RVs), heavy trucks, heavy equipment, agricultural machines, or the like.

As used in this specification, the term "interior surface" means a surface of an object facing the interior of a vehicle, and the term "interior side" means the side of an object that is closer to the interior of the vehicle than to the windshield when the adjustable window shade is in the deployed configuration.

As used in this specification, the term "windshield surface" means a surface of an object facing a windshield of a vehicle, and the term "windshield side" means the side of an object that is closer to the windshield of the vehicle than to an innermost part of the vehicle when the adjustable window shade is in the deployed configuration.

As used herein, the term "permanent magnet" refers to an object that produces its own persistent magnetic field even in the absence of an applied magnetic field. Examples of materials that can be used to provide a permanent magnet through magnetization include ferromagnetic materials or ferrimagnetic materials including alnico, ferrite, magnetite, lodestone, iron, nickel, cobalt, and magnetic alloys including magnetic alloys containing rare earth metals.

As used herein, the term "magnetic material" refers to a material that produces a magnetic field in response to an applied magnetic field (e.g. a magnetic field applied by a permanent magnet), but which is not itself a permanent magnet. Examples of materials that are considered to be magnetic materials include ferromagnetic materials or ferrimagnetic materials including alnico, ferrite, magnetite, lodestone, iron, nickel, cobalt, and magnetic alloys including magnetic alloys containing rare earth metals. As used herein, the term "magnetic element" refers to a component made from a magnetic material, which is optionally but not necessarily a permanent magnet.

The inventor has now developed an adjustable window shade (sometimes referred to as a sun shade) that can be conveniently deployed in a plurality of different locations as desired on a window of a vehicle in order to block sunlight or other undesired light sources from almost any orientation. The window shade has a shade portion (sometimes referred to as a light shading component) having a magnetic element and a magnetic attachment point having a magnet that can be secured in position on a window of the vehicle. The magnetic attachment point can be deployed in any desired location on a window, and then the shade portion can be magnetically coupled to the magnetic attachment point and be deployed on an interior surface of the window to block the sun or other undesired light sources. In some embodiments, the magnetic attachment point comprises a pair of magnets positioned opposite one another on a window of the vehicle. The position of the pair of magnets on the window can be adjusted by manually sliding one of the magnets along the window. The magnetic attractive forces between the pair of magnets will cause the second magnet to slide along the window together with the first magnet.

FIG. 1 shows an example embodiment of an adjustable window shade 10 in a deployed configuration wherein adjustable window shade 10 is removably secured onto an interior surface 40 of a windshield 12 of a vehicle. Adjustable window shade 10 can be used on other windows, including a side window or a rear window of a vehicle or the like. Adjustable window shade 10 may also be used on windows of a non-vehicle structure, including a house or other building or the like. Adjustable window shade 10 can be conveniently deployed in a plurality of different locations as desired on windshield 12 in order to block sunlight or other undesired light sources from almost any orientation.

Adjustable window shade 10 has as a first component a light shading component 18 containing a magnetic element 28 and as a second component a magnetic attachment point 19 having a magnet securable in position on windshield 12.

In the illustrated embodiment, magnetic attachment point 19 has a first window magnet 14 that can be removably attached to the inside of windshield 12 via magnetic engagement with a second window magnet 16 disposed on the outside of windshield 12 and collocated with first window magnet 14 so that first and second magnets 14, 16 attract each other and are thereby secured in position on windshield 12 to provide a magnetic attachment point 19. In some embodiments, both first and second magnets 14, 16 are permanent magnets. In some embodiments, first window magnet 14 is a permanent magnet, and second window magnet 16 is a magnetic element but is not a permanent magnet.

First and second window magnets 14, 16 can have any desired shape or configuration, as long as they have a magnetic strength strong enough to cooperate and secure each other against windshield 12 to provide magnetic attachment point 19 and still be reasonably readily removed by a user (i.e. if the magnetic attractive forces are too strong, a user may have difficulty in removing magnetic attachment point 19 from the windshield—this could be acceptable in some embodiments, e.g. in which it is intended that magnetic attachment point 19 will be deployed on windshield 12 for a long or indefinite period of time).

In some embodiments, by way of example only, first and second window magnets 14, 16 are each about ½ inch by ⅛ inch permanent magnets and have a magnetic strength of 9 lbs. Any suitable dimensions and strengths of magnet can be determined based on those skilled in the art based on the particular windshield with which the adjustable window shade 10 is to be used and the particular desired functional characteristics for any given application, e.g. to have sufficient strength and size to hold the window shade 10 in position while in use, allow window shade 10 to be slid easily across the windshield surface, be positioned and stored in an unobstructive manner when not in use, and so on. In some embodiments, first and second window magnets 14, 16 are dimensioned so that when they are not in use, they can be slid to a corner of windshield 12 where they will not be contacted by the vehicle's windshield wipers when the latter are in use.

In some other embodiments, first window magnet 14 is removably secured to windshield 12 by any other suitable means, including by a suction cup, hook and loop fastener engaged to windshield 12, slotted receptacle engaged to windshield 12, or the like to provide magnetic attachment point 19. In such embodiments, second window magnet 16 may be omitted.

In some embodiments, first window magnet 14 is fixedly or permanently secured to windshield 12 in any suitable manner, for example by use of an adhesive, suitable fasteners or the like, to provide magnetic attachment point 19. In such embodiments, second window magnet 16 may be omitted and the position of first window magnet 14 relative to windshield 12 is not adjustable.

In some embodiments, first window magnet 14 could be secured to the outside surface of windshield 12 via any of the aforementioned mechanisms to provide magnetic attachment point 19 and second window magnet 16 could be omitted, provided that first window magnet 14 was sufficiently strong to engage with shade magnet 28 on the inside surface of windshield 12. In some embodiments, first window magnet 14 is secured to the inside surface of windshield 12 via any of the aforementioned mechanisms to provide magnetic attachment point 19.

In the illustrated embodiment, when first and second window magnets 14, 16 are secured onto windshield 12, they are sildable together along windshield 12 so that the position of magnetic attachment point 19 can be adjusted. For example, when first window magnet 14 is moved along windshield 12, first window magnet 14 causes second magnet 16 to move together with first window magnet 14 due to the magnetic attractive forces between the two magnets. In such embodiments, first window magnet 14 needs to have a magnetic strength strong enough to cause second window magnet 16 to move together with first window magnet 14 on opposite sides of windshield 12. Likewise, movement of second magnet 16 by sliding could be used to cause first window magnet 14 to undergo a corresponding sliding motion to thereby move magnetic attachment point 19.

In some embodiments, first window magnet 14 and second window magnet 16 are coated with plastic, a hard durable paint, or other suitable protective material. In some embodiments, coating with plastic or other suitable protective material may make the magnets more durable and/or may help to prevent scratches on windshield 12. In some embodiments, first and second window magnets 14, 16 are rare earth magnets having a smooth metal exterior and will not generally scratch windshield 12. In some embodiments, the plastic, hard durable paint, or other suitable protective material with which first and second window magnets 14, 16 are coated is selected so as not to leave streaks, marks or scratches on the surface of windshield 12.

Figure 2:
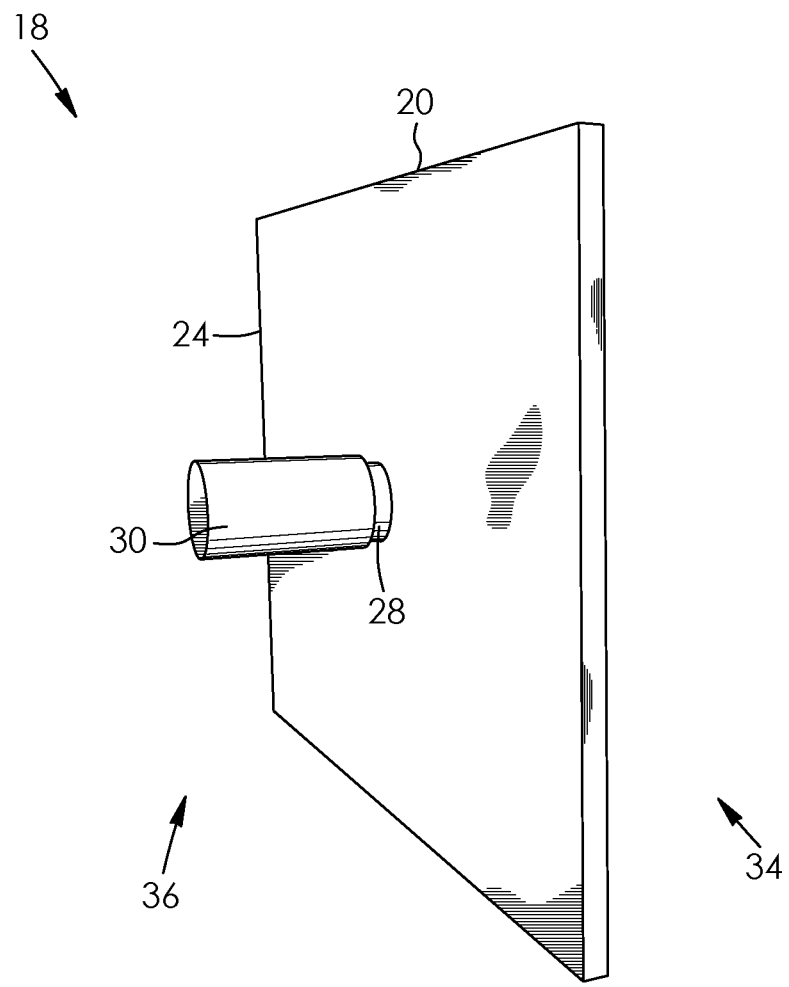
FIG. 2 shows a perspective view from the interior side of a light shading component of the embodiment of FIG. 1.
Figure 3:
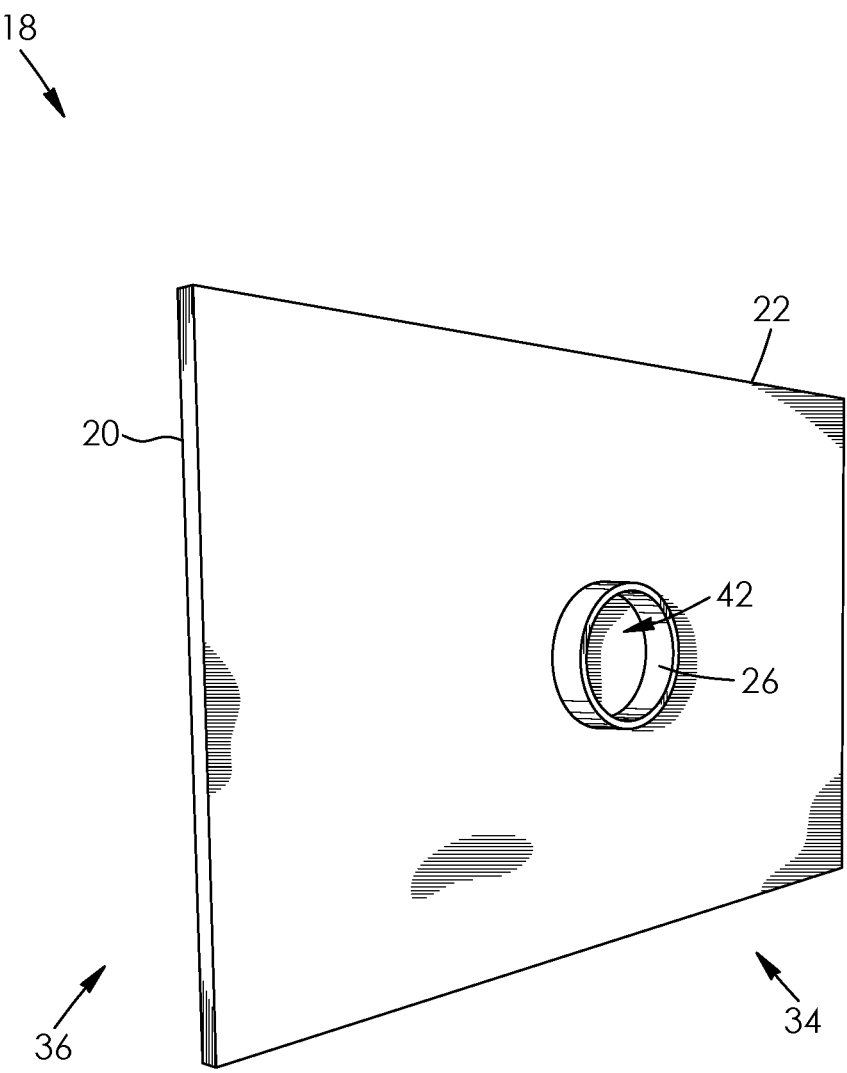
FIG. 3 shows a perspective view from the windshield side of a light shading component of the embodiment of FIG. 1.

Better shown in FIGS. 2 and 3, light shading component 18 has a shade body 20 with a magnetic element 28. Shade body 20 has first and second opposed surfaces 22, 24. In the deployed configuration as shown in FIG. 1, first surface 22 is oriented towards windshield 12 and is therefore referred to also as windshield surface 22, better shown in FIG. 3, and second surface 24 is oriented towards the interior of the vehicle and is therefore referred to also as interior surface 24, as better shown in FIG. 2.

Shade body 20 can have varying shapes and sizes in alternative embodiments. Shade body 20 can be made of any appropriate material for blocking light (including sunlight) or reducing the amount of light entering into a vehicle. In some embodiments, shade body 20 is made of cardboard, plastic, metal foil, mesh netting (with some support structure or frame) or combinations thereof. In some embodiments, shade body 20 is made of a stiff material coated with a reflective material to block and reflect sunlight. In some embodiments, shade body 20 is made of a translucent or opaque material to filter light and reduce the amount of light shining through windshield 12 and into the vehicle without fully blocking the light.

In some embodiments including the illustrated embodiment, a boundary element 26 extends from first surface 22 of shade body 20 to contain first window magnet 14 in an interior space 42 as described below.

In some embodiments, including the illustrated embodiment, interior surface 24 of shade body 20 has a shade magnetic element such as a shade magnet 28 and a handle 30 secured to interior surface 24. In some embodiments, shade magnet 28 is a permanent magnet. In some embodiments, shade magnet 28 is made from a magnetic material but is not a permanent magnet.

In the illustrated embodiment, shade magnet 28 connects handle 30 to shade body 20. Shade magnet 28 is secured to shade body 20 in any suitable manner and at any suitable location to provide the magnetic element used to secure light shading component 18 to magnetic attachment point 19.

Shade magnet 28 is coupled to or engaged with shade body 20 in any suitable manner, for example by the use of suitable adhesives or fasteners. In the illustrated embodiment, shade magnet 28 is fixed to interior surface 24 of shade 20. Shade magnet 28 can have any desired shape or configuration as long as shade magnet 28 has a magnetic strength strong enough to cooperate with magnetic attachment point 19 to secure light shading component 18 on windshield 12. The degree of magnetic engagement between shade magnet 28 and first window magnet 14 should be sufficiently strong to secure light shading component 18 in place, but not so strong that a user will have undue difficulty in removing light shading component 18 from the magnetic attachment portion such as first window magnet 14.

In one exemplary and non-limiting embodiment, shade magnet 28 is about ½ inch by ⅛ inch and has a magnetic strength of 9 lbs. A person skilled in the art would be able to determine suitable dimensions and magnetic strengths to use for shade magnet 28 depending on the relative magnetic properties of first window magnet 14, desired ease of removing shade magnet 28 from first window magnet 14, and so on.

In some embodiments, instead of being fixed on the interior surface 24 of shade body 20, shade magnet 28 is fixed within shade 20 or to first surface 22 of shade body 20. The exact positioning of shade magnet 28 on shade body 20 is not critical, so long as shade magnet 28 is positioned to magnetically engage with the magnetic attachment point 19 on windshield 12. For example, in some embodiments, shade magnet 28 could be provided on the first surface 22 of shade body 20 and directly contact first window magnet 14 to secure light shading component 18 in position on windshield 12. In such embodiments, boundary element 26 may be omitted or alternatively the axial length by which boundary element 26 projects beyond windshield surface 22 may be the same or slightly shorter than the length by which shade magnet 28 projects from window surface 22.

In some embodiments, including the illustrated embodiment, a handle 30 is fixed to the interior surface 24 of shade body 20 and is on the interior side 36 of shade body 20. In the illustrated embodiment, shade magnet 28 interposes handle 30 and shade body 20. In other embodiments, handle 30 is fixed directly to shade body 20 and shade magnet 28 is secured elsewhere. In alternative embodiments, handle 30 need not be secured directly to interior surface 24 but can be coupled to light shading component 18 in any way so that the handle extends into or towards the interior of the vehicle.

In the illustrated embodiment, handle 30 is provided as a generally cylindrical projection extending normal to second surface 24 of shade body 20. In other embodiments, handle 30 can have varying shapes, sizes, configurations and/or orientations, as long as a user is able to grab handle 30 and adjust the location of light shading component 18 relative to windshield 12 and/or remove light shading component 18 from magnetic attachment point 19 on windshield 12.

In some embodiments, handle 30 is omitted and a user adjusts the location of light shading component 18 relative to windshield 12 and/or removes light shading component 18 from windshield 12 by pulling directly on shade body 20. Providing a handle 30 may make it easier for a user to move or remove light shading component 18 from magnetic attachment point 19.

Better shown in FIG. 3, in the illustrated embodiment, boundary element 26 is a generally cylindrical ring that projects from first surface 22 of shade body 20, away from the windshield side 34 of light shading component 18. In other embodiments, boundary element 26 can have varying shapes and sizes.

In some embodiments, boundary element 26 is omitted and shade body 20 and/or shade magnet 28 directly contacts magnetic attachment point 19 in embodiments in which magnetic attachment point 19 includes at least a component on the interior side of windshield 12 (e.g. directly contacts first window magnet 14 in the illustrated embodiment), or shade body 20 and/or shade magnet 28 directly contacts the interior surface of windshield 12 in embodiments in which the magnetic attachment point 19 is provided entirely on the exterior side of windshield 12.

In the illustrated embodiment, boundary element 26 is a generally cylindrical projection or ring that extends from first surface 22 of shade body 20 so that when shade magnet 28 cooperates with magnetic attachment point 19 to hold light shading component 18 on windshield 12, there is a standoff distance or space 32 between shade body 20 and windshield 12. In some embodiments, providing standoff distance 32 between shade body 20 and windshield 12 may make it easier for a user to remove light shading component 18 from magnetic attachment point 19, e.g. because a user can angle shade body 20 relative to windshield 12 and thereby use one edge of shade body 20 as a leverage point to detach shade magnet 28 from magnetic attachment point 19.

In the illustrated embodiment, boundary element 26 projects generally perpendicularly to the plane of window surface 22 of shade body 20. In alternative embodiments, boundary element 26 could project at an angle or have an angled surface for contacting windshield 12 if desired, so long as the degree of angle used was not so great as to interfere with the placement of light shading component 18 on windshield 12.

Further, in use, when light shading component 18 is secured on windshield 12 by the cooperation of first window magnet 14 and shade magnet 28, boundary element 26 abuts against the inside of windshield 12 and surrounds window magnet 14. Shade magnet 28 is thus positioned within the perimeter defined by boundary element 26, i.e. shade magnet 28 is collocated with boundary element 26.

In embodiments in which boundary element 26 is provided, boundary element 26 can define a radius within which the collective magnetic strength of shade magnet 28 and first window magnet 14 is strong enough to hold and pull light shading component 18 towards windshield 12 to secure light shading component 18 in position. In such embodiments, within the boundary defined by boundary element 26, shade magnet 28 and first window magnet 14 pull light shading component 18 towards windshield 12 to a sufficient degree to secure light shading component 18 in position. Outside the boundary element 26, the magnetic strength of shade magnet 28 and first window magnet 14 may not be strong enough to hold and pull light shading component 18 towards windshield 12 to secure light shading component in place on windshield 12. Boundary element 26 may assist a user to determine a zone of possible locations within which window shade 10 can be secured to windshield 12 so that the user can avoid unnecessary trial and error in determining such a zone where the magnetic strength is strong enough to hold and pull light shading component 18 towards windshield 12 to secure light shading component in place on windshield 12.

Additionally, in embodiments in which boundary element 26 is provided, boundary element 26 can in assist adjusting the position of magnetic attachment point 19 relative to windshield 12 by providing a physical force in addition to the relative attractive magnetic force that exists between shade magnet 28 and first window magnet 14. For example, after boundary element 26 moves a sufficient distance so that it is in direct contact with first window magnet 14, further movement of boundary element 26 along windshield 12 will slide first window magnet 14 together with light shading component 18 and thereby cause second window magnet 16 to also slide along the exterior surface of windshield 12 due to the relative attractive forces between first and second window magnets 14, 16. As such, boundary element 26 provides a physical force in addition to the magnetic attractive forces between first window magnet 14 and second window magnet 16 to ensure that magnetic attachment point 19 moves with shade body 20.

Additionally, in embodiments in which boundary element 26 is provided, boundary element 26 provides standoff distance or space 32 between shade body 20 and windshield 12. Standoff distance 32 between shade body 20 and windshield 12 weakens the magnetic attractive forces between first window magnet 14 and shade magnet 28 so that when shade magnet 28 is detached from magnetic attachment point 19, the weakened magnetic attractive forces will not dislodge first window magnet 14 from second window magnet 16 due to the relatively stronger magnetic attractive forces between first window magnet 14 and second window magnet 16 than between first window magnet 14 and shade magnet 28.

In use, a user can hold handle 30 and slide light shading component 18 relative to windshield 12 so that shade body 20 can be deployed effectively to block and/or reflect sun or other undesired bright light from impairing a driver's or passenger's vision, regardless of the angle at which the sun or other undesired bright light is striking the vehicle. For example, in the illustrated embodiment, light shading component 18 can be moved until boundary element 26 is in direct contact with an edge of first window magnet 14. After boundary element 26 is in direct contact with first window magnet 14, further movement of boundary element 26 along windshield 12 will slide first window magnet 14 together with light shading component 18 and thereby cause second window magnet 16 to also slide along the exterior surface of windshield 12. As such, the location of light shading component 18 can be adjusted relative to windshield 12.

In other embodiments, the movement of light shading component 18 relative to windshield 12 is limited. For example, when first window magnet 14 is removably secured to windshield 12 by means other than second window magnet 16 and the location of first window magnet 14 relative to windshield 12 is not adjustable, light shading component 18 can only be moved until the strength of the magnetic interaction between first window magnet 14 and shade magnet 28 is overcome, at which point light shading component 18 will no longer be secured to windshield 12.

In use in one example embodiment, to block sunlight or reduce the amount of sunlight entering into a vehicle, a user secures first window magnet 14 on the inside of windshield 12. This can be done by collocating first window magnet 14 and second window magnet 16 on opposite sides of windshield 12. First window magnet 14 and second window magnet 16 hold each other in position against windshield 12 via their respective attractive magnetic forces, so that first window magnet 14 is held in position on the inside of windshield 12 and second magnet 16 is held in position on the outside of windshield 12 to provide magnetic attachment point 19.

The user can adjust the location of first window magnet 14 and second window magnet 16 (and thereby the position of magnetic attachment point 19) by sliding first window magnet 14 along the interior surface of windshield 12, thereby causing second window magnet 16 to slide together with first window magnet 14.

The user can then adjustably secure light shading component 18 on windshield 12 by moving shade magnet 28 towards first window magnet 14 so that the two magnets attract each other and the magnetic attractive forces therebetween hold light shading component 18 on windshield 12.

The user can adjust the location of light shading component 18 relative to windshield 12. This can be done by sliding light shading component 18 along windshield 12 until boundary member 26 is in direct contact with first window magnet 14. The user can further slide boundary member 26 along windshield 12 and this causes first window magnet 14 to slide along windshield 12 which in turn causes second window magnet 16 to slide together with first window magnet 14. As the location of window shade 10 is adjusted, window shade 10 can be used effectively to block and/or reflect moving and blinding sun or other undesired light source, even as the orientation of incident light changes. In embodiments in which a handle 30 is provided, a driver may be able to more easily slide light shading component 18, e.g. using only one hand while still retaining the driver's other hand on the steering wheel of the vehicle.

Figure 4:
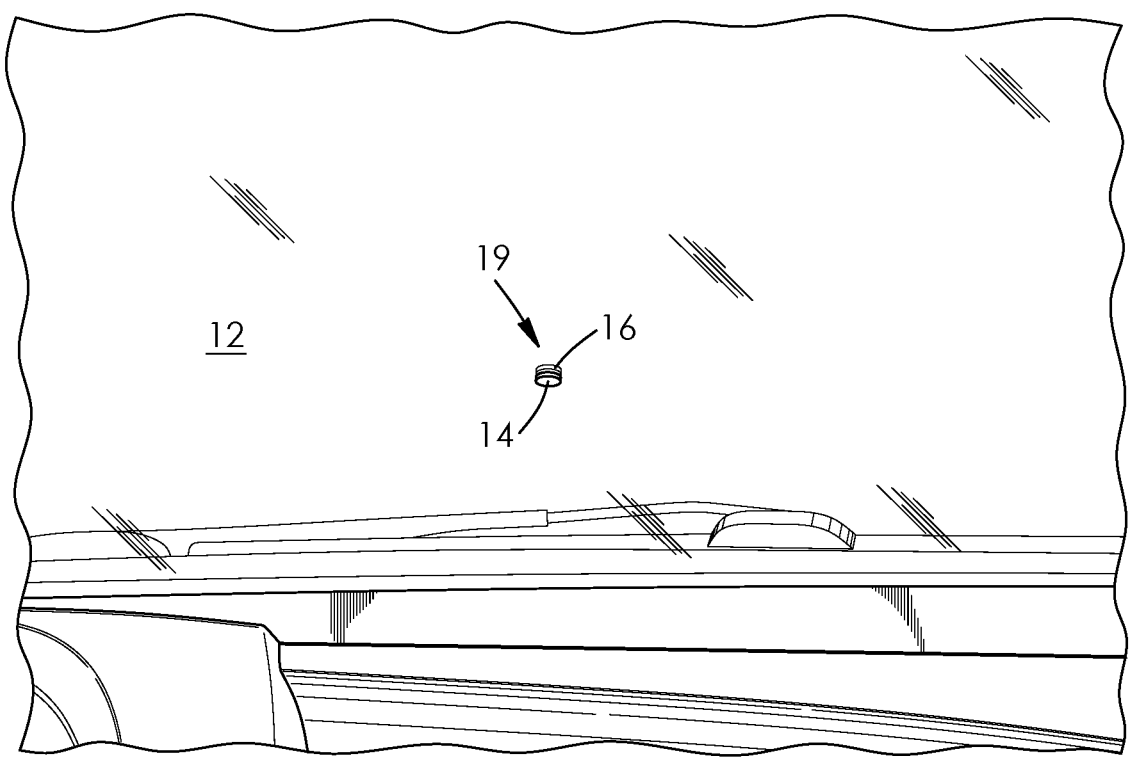
FIG. 4 shows an example embodiment of a magnetic attachment point comprising first and second magnets, the first and second magnets being collocated on opposite sides of a front windshield of a vehicle.
Figure 5:
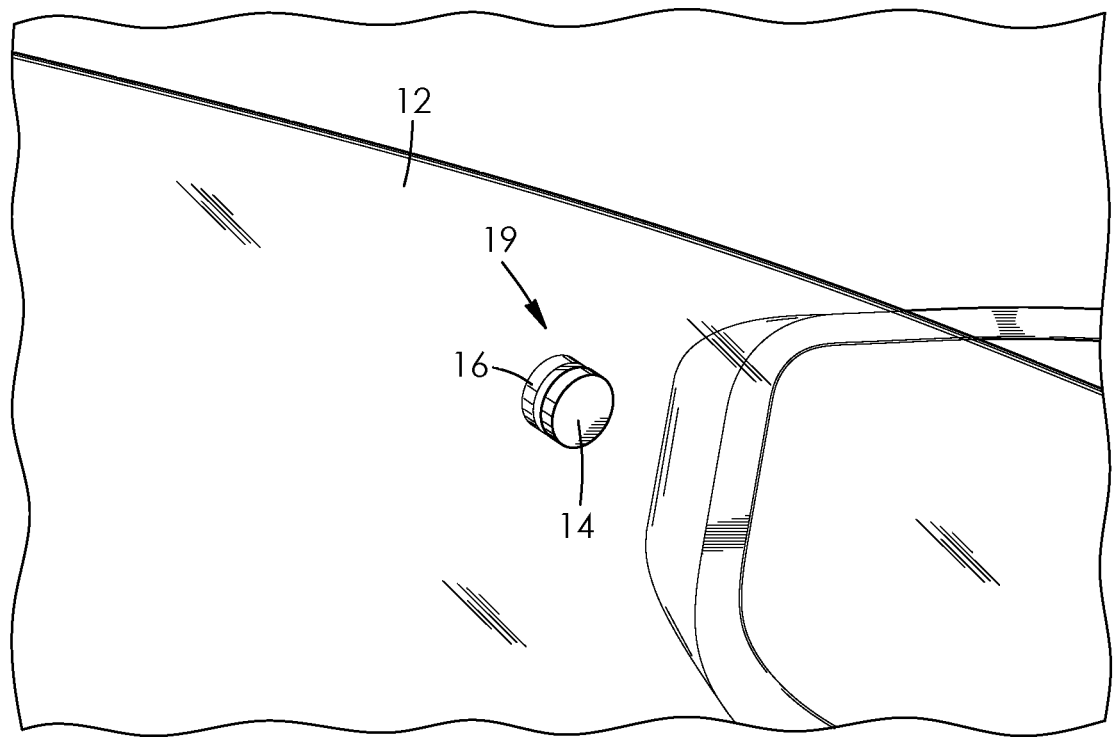
FIG. 5 shows an example embodiment of a magnetic attachment point comprising first and second magnets, the first and second magnets being collocated on opposite sides of a side window of a vehicle.

FIGS. 4-8 show embodiments of a window shade 10 in various views and states of deployment. FIG. 4 shows an example embodiment of a magnetic attachment point 19 made of first and second window magnets 14, 16 deployed on opposite sides of a front windshield 12 of a car. FIG. 5 shows an example embodiment of a magnetic attachment point 19 made of first and second window magnets 14, 16 collocated on opposite sides of a side window 12 of a car.

Figure 6:
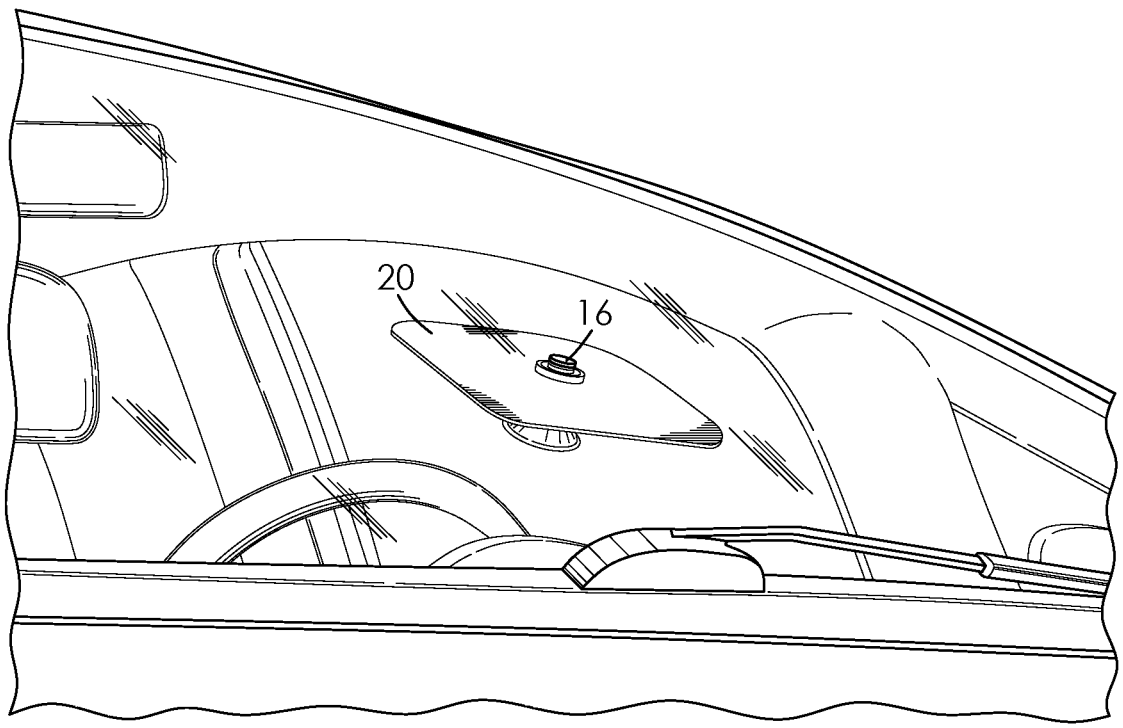
FIG. 6 shows an example embodiment of a window shade installed on the inside surface of a front windshield of a vehicle using the magnetic attachment point of FIG. 4, viewed from the outside of the vehicle, i.e. showing the windshield side of the window shade.
Figure 7:
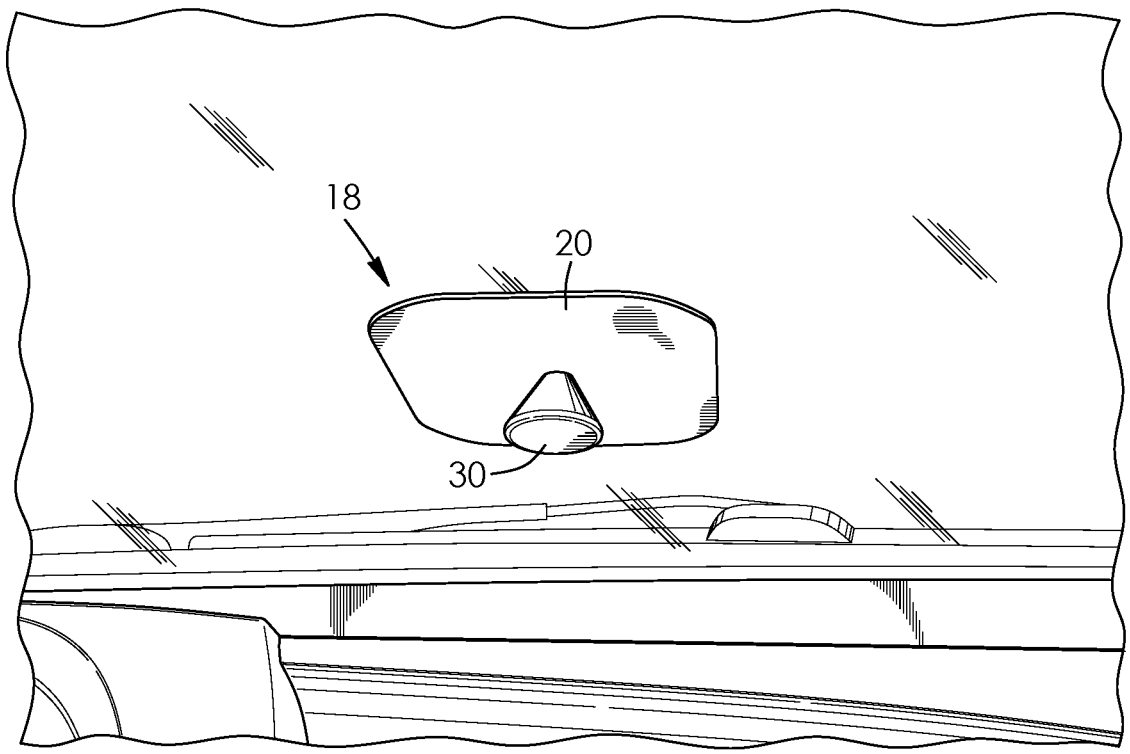
FIG. 7 shows the embodiment of FIG. 6 viewed from the interior of the vehicle, i.e. showing the interior side of the window shade.
Figure 8:
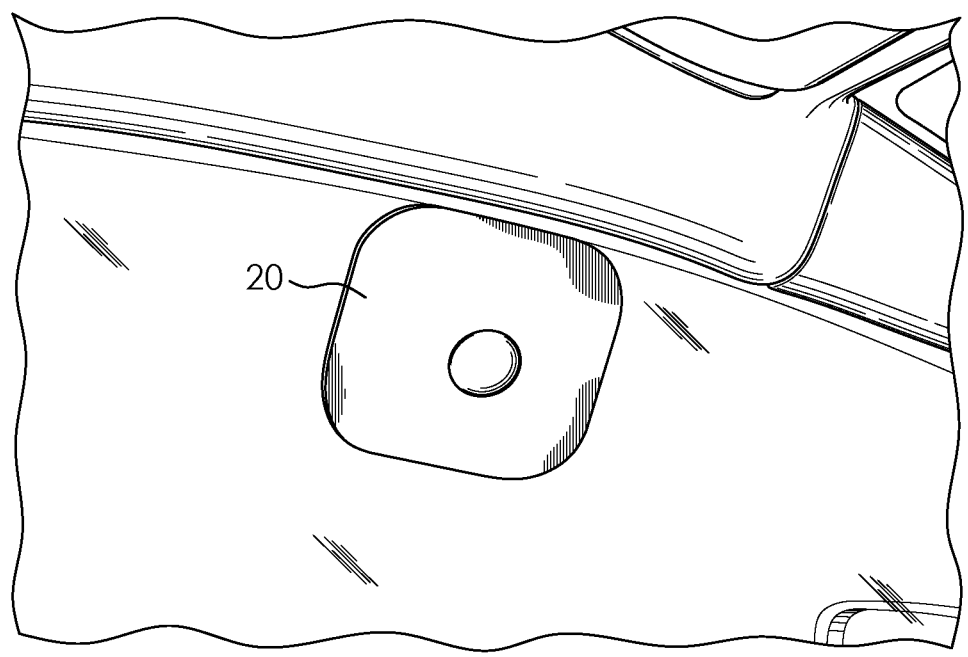
FIG. 8 shows an example embodiment of a window shade installed on the inside surface of a side window of a vehicle using the magnetic attachment point of FIG. 5, viewed from the interior of the vehicle, i.e. showing the interior side of the window shade.

FIG. 6 shows a view from the exterior of the vehicle and FIG. 7 shows a view from the interior of the vehicle of a window shade 10 deployed on the magnetic attachment point 19 of FIG. 4. FIG. 8 shows a view from the interior of the vehicle of a window shade 10 deployed on the magnetic attachment point 19 of FIG. 5.

Figure 9:
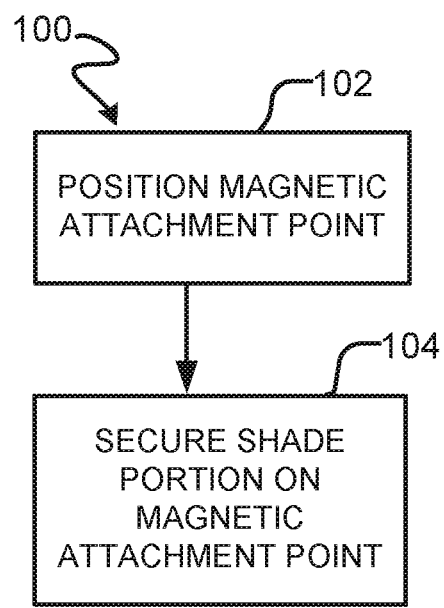
FIG. 9 shows an example embodiment of a method of deploying a window shade according to one example embodiment.

With reference to FIG. 9, an example embodiment of a method 100 for deploying an adjustable window shade is illustrated schematically.

At step 102, a magnetic attachment point is deployed at a desired location on a window. In some embodiments, the magnetic attachment point is removably and slidably deployed at a desired location on the window.

At step 104, a shade portion is secured to the magnetic attachment point via a magnetic element provided on the shade portion.

Figure 10:
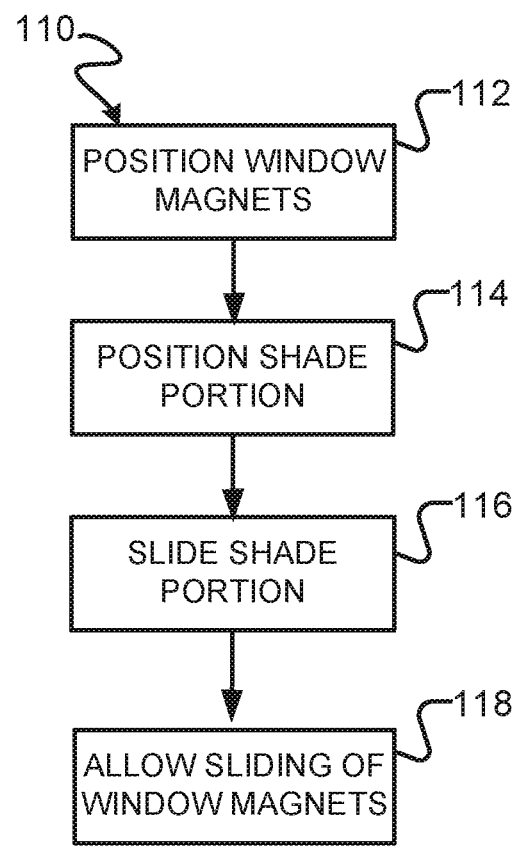
FIG. 10 shows an example embodiment of a method of using a window shade according to a second example embodiment.

With reference to FIG. 10, an example embodiment of a method 110 for using an adjustable window shade is illustrated schematically. At step 112, first and second window magnets are collocated on opposite sides of a window and secured in place by the magnetic engagement forces therebetween to provide a magnetic attachment point.

At step 114, a shade component is secured in position by collocation with the first and second window magnets through the respective magnetic engagement forces between a magnetic element provided on the shade component and the first and second window magnets. In some embodiments, the shade component is deployed on an interior surface of the window.

At step 116, the shade component is slid to a desired location on the window and, simultaneously at step 118, the first and second window magnets are permitted to slide with the shade component by reason of the attractive magnetic forces between the first and second window magnets and the magnetic element provided on the shade component.

Figure 11:
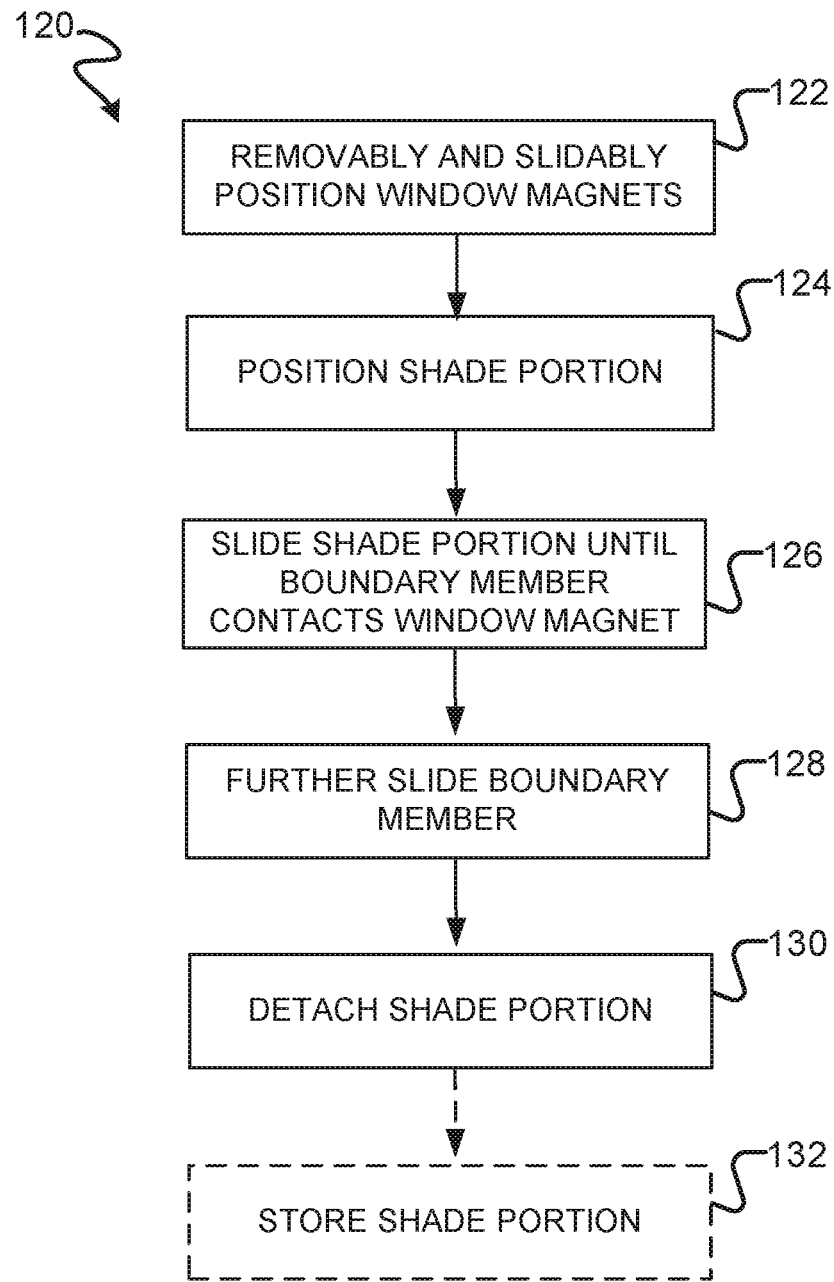
FIG. 11 shows an example embodiment of a method of using a window shade according to a third example embodiment.

With reference to FIG. 11, an example embodiment of a method 120 for using an adjustable window shade is illustrated schematically. At step 122, a magnetic attachment point is removably and slidably mounted at a desired location on the window. In some embodiments, this is done by removably attaching a first window magnet to the inside of a windshield via magnetic engagement with a second window magnet disposed on the outside of the windshield and collocated with the first magnet so that the first and second magnets attract each other and are thereby secured in position on the windshield to provide a magnetic attachment point.

At step 124, a light shading component having a shade magnet and a boundary member is secured in position. This is done by moving the shade magnet towards the first window magnet so that the boundary member surrounds the first window magnet and the first window magnet and the shade magnet attract each other and hold the light shading component on the windshield.

At step 126, the location of the light shading component relative to the windshield is adjusted by sliding the light shading component along windshield until the boundary member is in direct contact with the first window magnet.

At step 128, the location of the light shading component relative to the windshield is further adjusted by sliding the boundary member along the windshield and causing the first window magnet to slide along windshield which in turn causes the second window magnet to slide together with the first window magnet.

As the location of the window shade is adjusted, the window shade can be used effectively to block and/or reflect moving and blinding sun or other undesirable light source.

In some embodiments, step 128 is omitted and the movement of the light shading component relative to the windshield is limited. For example, in embodiments in which the magnetic attachment point is fixed on the window (i.e. is not movable), the light shading component may only be moved until the boundary element is in direct contact with a component of the magnetic attachment point on the inside surface of the window.

At step 130, the light shading component is detached by angling it relative to the windshield. Specifically, using either any handle provided on the light shading component or by grasping an edge of the light shading component, a user can lift one edge of the light shading component and thereby use the opposite edge of the light shading component as a leverage point to help the user to detach the shade magnet from the magnetic attachment point.

At step 132, which is optionally included in some embodiments, a user uses an elastic band, clip, clamp or other suitable engaging member to affix to clip the shading component onto an interior sun visor of the vehicle for storage, so that the shading component can be easily retrieved when needed again for deployment.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are consistent with the broadest interpretation of the specification as a whole.

Without limiting the foregoing and by way of example only, while herein the deployment of a window shade has been described with reference to positioning the light shading component on an interior surface of the vehicle window, in alternative embodiments if desired, the light shading component could be deployed on an exterior surface of the vehicle window. Such embodiments may be less desirable because a driver cannot readily adjust the position of the window shade while driving, and further the force of air moving past the vehicle might be sufficient to dislodge the light shading component from the magnetic attachment point.

The invention claimed is:

1. A window shade comprising:
a magnetic attachment point adapted to be mounted on a window; and
a shade portion having a shade magnet for engaging the magnetic attachment point;
wherein the magnetic attachment point comprises a first magnet and a second magnet adapted to be secured in position on the window by relative attractive forces between the first magnet and the second magnet when the first magnet and the second magnet are collocated on opposite sides of the window in an installed configuration.

2. The window shade as defined in claim 1, wherein the magnetic attractive strength between the first magnet and the second magnet is sufficient to secure both the first magnet and the second magnet and the shade portion in position on the window when the first and the second magnet are in the installed configuration.

3. The window shade as defined in claim 1, wherein the first magnet and the second magnet are slideable on the window when the first magnet and the second magnet are in the installed configuration.

4. The window shade as defined in claim 1, wherein the shade portion comprises a shade body, and wherein the shade magnet is associated with the shade body, the shade magnet being positioned and configured to magnetically engage with the magnetic attachment point when the window shade is in a deployed configuration.

5. The window shade as defined in claim 4, wherein the shade body comprises a boundary element on a windshield surface of the shade body.

6. The window shade as defined in claim 5, wherein the boundary element comprises a tubular projection extending perpendicular to the windshield surface of the shade body.

7. The window shade as defined in claim 6, wherein the tubular projection extends from the windshield surface of the shade body by a standoff distance and when the window shade is in a deployed configuration, the standoff distance is between the windshield surface and the shade body.

8. The window shade as defined in claim 4, wherein the shade portion comprises a handle on an interior side of the shade body.

9. The window shade as defined in claim 8, wherein the shade magnet of the shade portion connects the handle and the shade body.

10. A method of deploying a window shade on a window, the method comprising:
mounting a magnetic attachment point on the window; and
securing a shade portion to the magnetic attachment point via a shade magnet provided on the shade portion;
wherein mounting the magnetic attachment point on the window comprises securing a first magnet and a second magnet together on opposite sides of the window via the relative attractive magnetic forces between the first magnet and the second magnet, the first magnet being positioned on an interior side of the window and the second magnet being positioned on an exterior side of the window.

11. The method as defined in claim 10, wherein securing the shade portion to the magnetic attachment point comprises surrounding the first magnet with a tubular boundary element projecting from a windshield surface of the shade portion.

12. The method of adjusting a position of a window shade on a window of a vehicle, the method comprising deploying the window shade on the window of the vehicle as defined in claim 11, the method further comprising a user sliding the shade portion to a desired location on the window, whereby the sliding of the shade portion causes a corresponding sliding of the magnetic attachment point on the window.

13. The method of adjusting a window shade on a window of a vehicle, the method comprising deploying the window shade on the window of the vehicle as defined in claim 11, the method further comprising sliding the shade portion until the tubular boundary element contacts the first magnet.

14. The method as defined in claim 13, further comprising continuing to slide the shade portion to thereby cause the tubular boundary element to slide the first magnet along the window.

15. A window shade comprising:
a first window magnet removably securable to a window;
a shade portion having:
a shade body;

a boundary member extending from the shade body; and a shade magnet secured to the shade and collocated with the boundary member, the shade magnet engagable with the first window magnet to hold the shade portion on the window via respective magnetic attractive forces between the shade magnet and the first window magnet; and a second window magnet, the second window magnet being suitable to secure the first window magnet in position on the window by co-locating the first window magnet and the second window magnet on opposite sides of the window in an installed configuration.

16. The window shade as defined in claim 15, wherein the first window magnet and the second window magnet are slidable with respect to the window when the first window magnet and the second window magnet are in the installed configuration.

17. The window shade as defined in claim 15, the boundary member defining an interior space, wherein the boundary member extends from a windshield surface of the shade body by a standoff distance and the standoff distance has a length that is larger than a thickness of the first window magnet.

\* \* \* \* \*